United States Patent
Koskelainen

(10) Patent No.: US 9,246,954 B2
(45) Date of Patent: Jan. 26, 2016

(54) LOCATION TAGGING METHOD FOR PACKET BASED SIGNALLING

(75) Inventor: Petri Kalevi Koskelainen, White Plains, NY (US)

(73) Assignee: Nokia Technologies Oy, Espoo (FI)

( * ) Notice: Subject to any disclaimer, the term of this patent is extended or adjusted under 35 U.S.C. 154(b) by 526 days.

(21) Appl. No.: 12/808,168

(22) PCT Filed: Dec. 13, 2007

(86) PCT No.: PCT/IB2007/004605
§ 371 (c)(1),
(2), (4) Date: Jun. 14, 2010

(87) PCT Pub. No.: WO2009/074846
PCT Pub. Date: Jun. 18, 2009

(65) Prior Publication Data
US 2010/0274908 A1    Oct. 28, 2010

(51) Int. Cl.
*H04L 12/701* (2013.01)
*H04L 12/725* (2013.01)
*H04L 29/06* (2006.01)

(52) U.S. Cl.
CPC ............ *H04L 65/1069* (2013.01); *H04L 45/00* (2013.01); *H04L 45/30* (2013.01); *H04L 65/1006* (2013.01)

(58) Field of Classification Search
CPC .............................. H04W 64/00; H04W 64/003
USPC .......................................................... 709/227
See application file for complete search history.

(56) References Cited

U.S. PATENT DOCUMENTS 6,278,454 B1    8/2001  Krishnan
7,050,815 B2 *  5/2006  I'Anson et al. ............ 455/456.1

(Continued)

FOREIGN PATENT DOCUMENTS

EP    1248440 A    10/2002
EP    1477302 A1   11/2004

(Continued)

OTHER PUBLICATIONS

International Search Report and Written Opinion Issued in Related Application PCT/IB2007/004605 on Mar. 26, 2009, whole document.

(Continued)

*Primary Examiner* — Asghar Bilgrami
(74) *Attorney, Agent, or Firm* — Harrington & Smith

(57) ABSTRACT

Location information is tagged in a packet based network. SIP signaling messages are used to initiate a communication session between at least two end user devices in a packet based telecommunications network. The communication session is routed through various intermediate network elements of the packet based network. The intermediate network elements tag the signaling messages with information indicating their geographic location or otherwise provide such location information. In response to the signaling messages and preferably before the communication session is established, the location information indicating the location of the intermediate network elements in the routing of the communication session between the end user devices is made available. An end user device or apparatus may receive the location information and provide a user display indicating the routing and status of the communication session being initiated.

20 Claims, 7 Drawing Sheets

(56) References Cited

U.S. PATENT DOCUMENTS

| | | | |
|---|---|---|---|
| 7,194,354 B1* | 3/2007 | Oran et al. | 701/408 |
| 7,535,905 B2* | 5/2009 | Narayanan et al. | 370/392 |
| 7,738,434 B1* | 6/2010 | Reuss et al. | 370/338 |
| 7,929,530 B2* | 4/2011 | Marshall et al. | 370/389 |
| 8,412,804 B2* | 4/2013 | Polk | 709/221 |
| 2006/0271693 A1* | 11/2006 | Thiebaut et al. | 709/229 |
| 2007/0030841 A1* | 2/2007 | Lee et al. | 370/352 |
| 2007/0076696 A1* | 4/2007 | An et al. | 370/352 |
| 2008/0162637 A1* | 7/2008 | Adamczyk et al. | 709/204 |
| 2009/0077189 A1* | 3/2009 | Requena | 709/206 |
| 2012/0036248 A1* | 2/2012 | Naqvi et al. | 709/223 |

FOREIGN PATENT DOCUMENTS

| | | |
|---|---|---|
| WO | 2004/110082 A | 12/2004 |
| WO | 2007/016452 A | 2/2007 |

OTHER PUBLICATIONS

M. Garcia-Martin, E. Henrikson, D. Mills, Private Header (P-Header Extensions to the Session Initiation Protocol (SIP) for the 3rd-Generation Partnership Project (3GPP), Network Working Group Request for Comments 3455, Jan. 2003, whole document.

Schulzrinne, Emergency Call Services for SIP-based Internet Telephony, Internet Engineering Task Force, Mar. 25, 2001, whole document.

C. Farrell, M. Shulze, S. Pleitner, D. Baldoni, DNS Encoding of Geographical Location, Network Working Group Request for Comments 1712, Nov. 1994, whole document.

J. Polk, J. Schnizlein, M. Linsner, Dynamic Host Configuration Protocol Option for Coordinate-based Location Configuration Information, Network Working Group, Request for Comments 3825, Jul. 2004, whole document.

J. Rosenberg, H. Schulzrinne, G. Camarillo, A. Johnston, J. Peterson, R. Sparks, M. Handley, E. Schooler, SIP: Session Initiation Protocol, Network Working Group, Request for Comments 3261, Jun. 2002, whole document.

"Location Conveyance for the Session Initiation Protocol—draft-ietf-sip-location-conveyance-13.tst", James Polk et al., Mar. 9, 2009, 46 pgs.

* cited by examiner

```
INVITE tel:+1-212-555-2222 SIP/2.0
Via: SIP/2.0/UDP pcscf1.visited1.net;branch=z9hG4bK240F34.1,
     SIP/2.0/UDP [5555::aaa:bbb:ccc:ddd]:1357;comp=sigcomp;branch=z9hG4bKnashds7
Max-Forwards: 69
Route: <sip:scscf1.home1.net;lr>
Record-Route: <sip:pcscf1.visited1.net;lr>
P-Asserted-Identity: "John Doe" <sip:user1_public1@home1.net>
P-Access-Network-Info: 3GPP-UTRAN-TDD; utran-cell-id-3gpp=234151D0FCE11
P-Charging-Vector: icid-value="AyretyU0dm+6O2IrT5tAFrbHLso=023551024"
Privacy: none
From: <sip:user1_public1@home1.net>;tag=171828
To: <tel:+1-212-555-2222>
Call-ID: cb03a0s09a2sdfglkj490333
Cseq: 127 INVITE
Require: precondition
Supported: 100rel
Contact: <sip:[5555::aaa:bbb:ccc:ddd]:1357;comp=sigcomp>
Allow: INVITE, ACK, CANCEL, BYE, PRACK, UPDATE, REFER, MESSAGE
Content-Type: application/sdp
Content-Length: (...)

(SDP not modified and not shown)
```

Figure 3 (prior art)

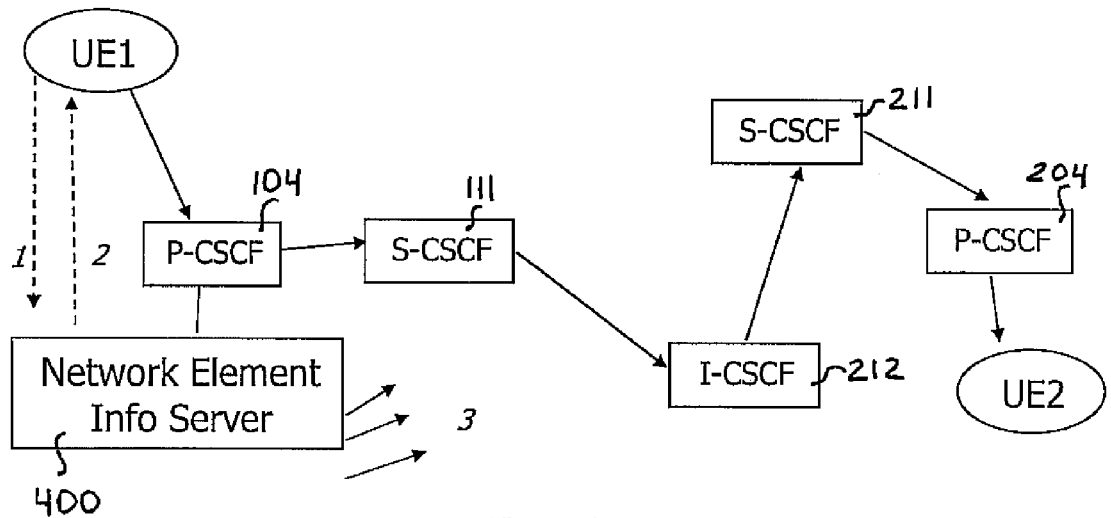

Figure 4

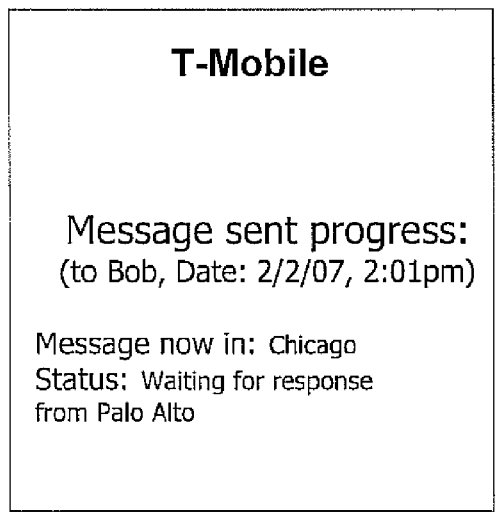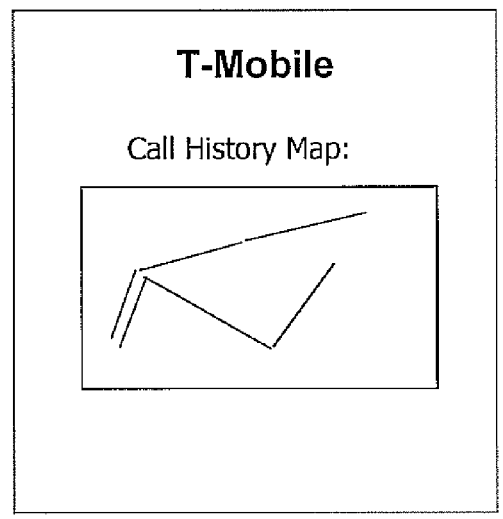
Figure 13
Figure 14

LOCATION TAGGING METHOD FOR PACKET BASED SIGNALLING

RELATED APPLICATION

This application was originally filed as PCT Application No. PCT/IB2007/004605 on Dec. 13, 2007, which is incorporated herein by reference in its entirety.

FIELD OF THE INVENTION

The present invention relates generally to telecommunications. More particularly, the invention relates to the signaling procedures for communications sessions in packet based telecommunications networks.

BACKGROUND

A packet based telecommunications network is a geographically distributed collection of nodes interconnected by communication links and segments for providing communication sessions (e.g., phone calls, multimedia and other data) between end nodes. The end nodes typically consist of user devices, such as personal computers, cell phones, personal digital assistants (PDAs), and the like. Many types of packet based telecommunications networks are available, with the types ranging from local area networks (LANs) to wide area networks (WANs). LANs typically connect nodes over dedicated private communication links located in the same general physical location, such as a building or campus. WANs, on the other hand, typically connect large numbers of geographically dispersed nodes over long-distance communication links, such as common carrier telephone lines. Examples of WANs are 3GPP and 3GPP2 compliant wireless networks, and Long Term Evolution (LTE) wireless networks. The nodes of packet based networks typically signal each other over the network by exchanging discrete frames or packets according to predefined protocols, such as the Transmission Control Protocol/Internet Protocol (TCP/IP). The Internet itself connects various networks throughout the world, providing global communication between nodes in the various networks.

A packet based telecommunications network may comprise a series of intermediate nodes (e.g., routers) that are configured to carry communications through the network to the end nodes. Routers are often configured to "route" data, such as packets, between various nodes in the network. Routing is typically performed at layer-3 (L3), which is the network layer of the Open Systems Interconnection (OSI) network model. Routers often maintain forwarding databases (FDBs), which are typically configured to hold routing information including L3 addresses and interface information that the router uses to determine where data (e.g., data packets) are to be forwarded in order to reach their destination. For example, a router may have a routing database containing one or more entries wherein each entry contains an L3 destination address of a destination node and interface information about an interface on the router through which the destination node may be reached. A data packet containing a destination address that matches a destination address of an entry in the routing table is forwarded by the router to the interface specified by the matching entry for transfer to the destination node.

The end nodes of a communication session are known and defined as part of the communication session. Although the physical (geographical) locations of the end nodes may initially be unknown, some IP based communication networks enable an end node to learn its geographic location from a server. In a wireless network, the server may employ triangulation or other methods to determine the end node's geographic location. The end node may then learn its location by issuing a request to the server to which the server responds with the geographic location. See, for example, European Patent Application No. 1 477 302 entitled "Integrating Geographical Contextual Information Into Mobile Enterprise Application", or IETF RFC 3825, by J. Polk et al., entitled "Dynamic Host Configuration Protocol Option for Coordinate-based Location Configuration Information". Numerous efforts to obtain the geographical location of end nodes is known for purposes of 9-1-1 and other emergency services. See, for example, draft IETF document entitled "Emergency Call Services for SIP-based Internet Telephony" by Henning Schulzrine, dated Mar. 25, 2001.

The packets for communications sessions are often routed through various networks and intermediate network elements. In packet based networks, each session (and even each message) may be transferred via a different route. For example, a call made from Australia to Finland may go through UK and Sweden while a similar call made a minute later may take a totally different route. In an ad-hoc network, such as a mesh network, this is further complicated since a user device may operate as either an end node or an intermediate node.

The physical (geographical) route of intermediate network elements through which the packets travel is not known in advance for several reasons. A router may execute one or more routing protocols that enable the router to route packets and exchange routing information with other routers in the network. The routers often use this information to configure (e.g., compute) their FDBs. The routing protocols may include distance-vector protocols, such as the Routing Information Protocol (RIP), or link-state protocols, such as the Intermediate-System-to-Intermediate-System (IS-IS) protocol and the Open Shortest Path First (OSPF) protocol.

Since the routing is not known in advance, the intermediate network elements are not known and may be signaling elements (such as a Call State Control Function (CSCF) in a 3GPP network), media gateways, or even user devices in an ad-hoc network. It would be useful to obtain information about the intermediate network elements. Furthermore, it will be useful to know the geographical location of the intermediate nodes routing a communication session. The intermediate nodes may be in different countries, even when both the end nodes are in the same country.

The reasons for this may be various. For example, an organization may want to route traffic via a foreign country for tax purposes (e.g. to avoid tax on local calls), or an operator's network infrastructure (e.g. operator's network elements) may be located in different countries. Currently, it is difficult to know reliably what network elements have been involved in a communication session and the countries in which those network elements are located.

This creates tax problems and law enforcement related problems. Different taxes may apply to communications based on the countries involved. Currently, it is very difficult to get and document this information reliably. Certain law enforcement actions, such as wiretapping, vary by jurisdiction. For example, different laws may apply to foreign communications (or communications that involve a foreign country). It is also difficult to know reliably if foreign countries were involved in the call (e.g. only the operator may be known). There are various prior attempts related to these concerns, but none of them are sufficient. For country boundary information, the operator identity provided by an network operator was typically enough to make the assumption that the home country of that operator was involved (similarly, visiting network information may have been available). For tax purposes, it was usually enough to trust the word of the operator.

For diagnostic purposes, there may be a natural disaster and/or human conflict strife affecting a region, city or neighborhood. It would be useful to know what effect this is having on communications, particularly geographic routing on a per session and/or per packet basis. Real-time diagnostic maps in which network elements are represented by their IP address or other identity information (and function name, such as CSCF) are not sufficient. Ad hoc networks could also benefit from diagnostic monitoring of routing as it is an easy way to find out which devices are willing and able to route communications traffic.

A network operator may maintain a separate database, which includes the physical location of network elements, but it is not previously known how to utilize that information in real-time or near real-time on a per session or a per packet basis. But a network element can be physically moved, and the database entry corresponding to that network element may not be updated properly when the location changes.

It also might be useful and entertaining for end users to know the geographical route for packet traffic of their communication sessions. Currently, when an end user is making a call, sending a message, or initiating another kind of communications session, the user device typically is not very informative and just displays "calling . . . " or "in progress" while the communications session is set up. While U.S. Pat. No. 6,278,454 does discuss a user interface (UI) that provides call progress information, it does not provide geographic routing or location information.

In light of the shortcomings described above, it would be advantageous to develop methods and network elements which enable tagging of the location of intermediate nodes for a communications session in a packet based network. It would be preferable to have methods and apparatus that permit a device, such as an end user device, to utilize the tagged location information for various purposes, such as displaying the routing and progress of the communication session.

BRIEF SUMMARY

The preferred embodiments of the invention involve methods and network elements in which location information and other advanced information of the network elements involved in the routing is added into the signaling for each communication session or message. The location information is useful for diagnostic purposes, law enforcement and tax purposes. The additional information may include, for example, host platform, CPU and memory information and even weather information around each network element (this may be useful in some games, and it may be entertaining for end-user).

Each network element along the route either adds its own information to the packet, or sends the information to a Network Element Information Server. The packet may be a SIP packet and the information may be added in a distinct SIP extension header. The geographical location information tagging can be done on a per packet or per session basis.

The end-user may be informed, in real-time or almost in real-time, by a user interface in the end user's device about the progress of the session setup (or message sending) with regard to the physical location of the network elements and the destination party involved, in addition to other information. The information may be shown to the end user in text, animation or graphical form. For example, the end user device may show a map and then highlight a location (e.g. "Detroit, Mich.") when the network element in that location has been involved, and draw a progressing line between the locations of the network elements.

BRIEF DESCRIPTION OF THE DRAWINGS

In association with the following detailed description of the preferred embodiments, reference will now be made to the accompanying drawings, where like numerals in different figures refer to the same element, and in which:

FIG. 3 is an example of a SIP INVITE message in the signaling of FIG. 2;

FIG. 4 is a block diagram of the architecture of an exemplary network with a Network Element Information Server;

FIG. 13 is an example of an end user device UI after a message is sent according to another preferred embodiment of the invention; and FIG. 14 is an example of call history shown in a map according to a preferred embodiment of the invention.

DETAILED DESCRIPTION OF THE PREFERRED EMBODIMENTS

Figure 1:
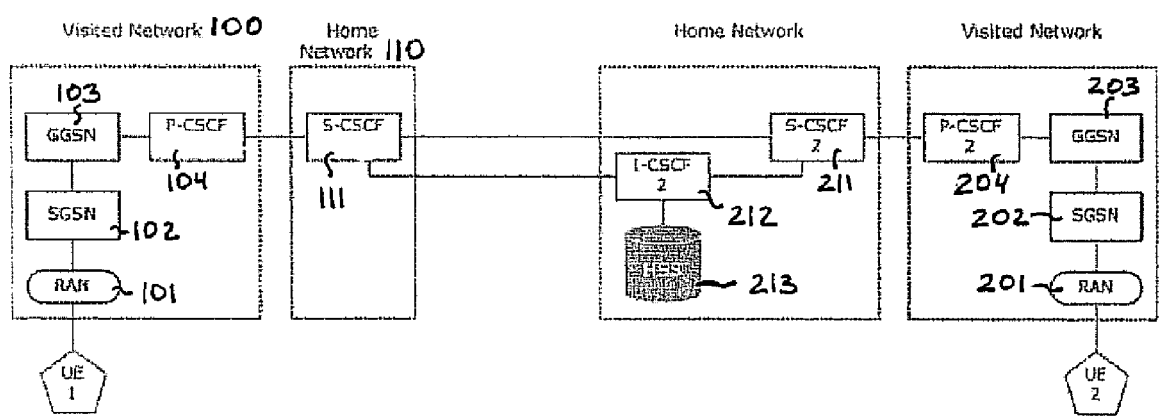
FIG. 1 is a block diagram of a 3GPP network having an IMS architecture and in which the preferred embodiments of the present invention may be implemented.

Preferred and exemplary embodiments of the present invention now will be described in detail with reference to the accompanying drawings. FIG. 1 shows an exemplary 3GPP wireless telecommunications network in which the preferred embodiments related to a SIP communication session may be implemented. It should be understood, however, that various embodiments of the present invention can be utilized in conjunction with a variety of other telecommunications networks and a variety of other communication services and features. Embodiments of the invention may be applied in various kinds of networks, especially packet based networks such as PacketCable networks.

As shown in FIG. 1, and discussed above in the background section, a communication session between two end user devices UE 1 and UE 2 in a prior art 3GPP network with an IMS architecture involves many intermediate network nodes. Assuming each end user device is roaming, there is a visited network 100 for UE 1 and visited network 200 for UE 2. Each visited network has a radio access network (RAN) 101, 201; a Serving GPRS Support Node (SGSN) 102, 202; a Gateway GPRS Support Node (GGSN) 103, 203; and a Proxy Call Session Control Function (P-CSCF) 104, 204. (The RAN 101, 201 is not a single network, but is instead comprised of several network elements.) The P-CSCF 104, 204 communicate respectively with a Serving Call Session Control Function (S-CSCF) 111, 211 in Home Network 110 of UE 1 and Home Network 210 of UE 2, which in turn communicate with an Interrogating Call Session Control Function (I-CSCF) 212 in Home Network 210 of UE 2. I-CSCF 212 accesses Home Subscriber Server 213 in Home Network 210 of UE 2 which, among other things, stores information on the physical location of UE 2. The actual physical transmission or IP packet transmission between the network elements, and other details of the network, can be derived from the published specifications of the Third Generation Partnership Project (3GPP) or from other sources. The preferred embodiments operate so as to be independent of, and not limited to, any particular physical layer environment.

A session control and messaging protocol may be employed to establish a session (connection) that supports a call between UE 1 as the calling party and UE 2 as the called party. An example of a session control and messaging protocol is the Session Initiation Protocol (SIP) is described in IETF RFC 3261 by J. Rosenberg et al., entitled "SIP: Session Initiation Protocol". SIP is used as a session control protocol (such as to establish and terminate a call) and a messaging protocol (such as to send an instant message). It operates at the application layer of the OSI Network Model and is defined to establish sessions between end user devices (e.g., SIP-based telephones) in a packet based communication network. After the session is established, typically a direct data session is established between the handsets.

Typically, SIP messages go from the user terminal to a first network element, then to next network element, and finally to the destination (which may be end-user device, registration server, application server or some other element). There is often large number of network elements involved along the route. Since it is implemented at the application layer, the actual physical transmission or IP packet transmission via IP level elements is not affected by the preferred embodiments and have no effect on the preferred embodiments.

At the beginning of a call, a session is typically established between the end user devices to support the call. Establishing a session between the parties often involves (a) authenticating both parties and (b) successfully exchanging a sequence of messages between the end users and intermediate nodes in a predetermined manner. Authentication usually involves ensuring the parties have permission to establish the call. The sequence of messages typically includes an INVITE message issued by the calling party, which is followed by a sequence of INVITE messages from one network node to the next, until the called party is reached, each INVITE message being substantially immediately responded to with a Trying ("100") message.

Figure 2:
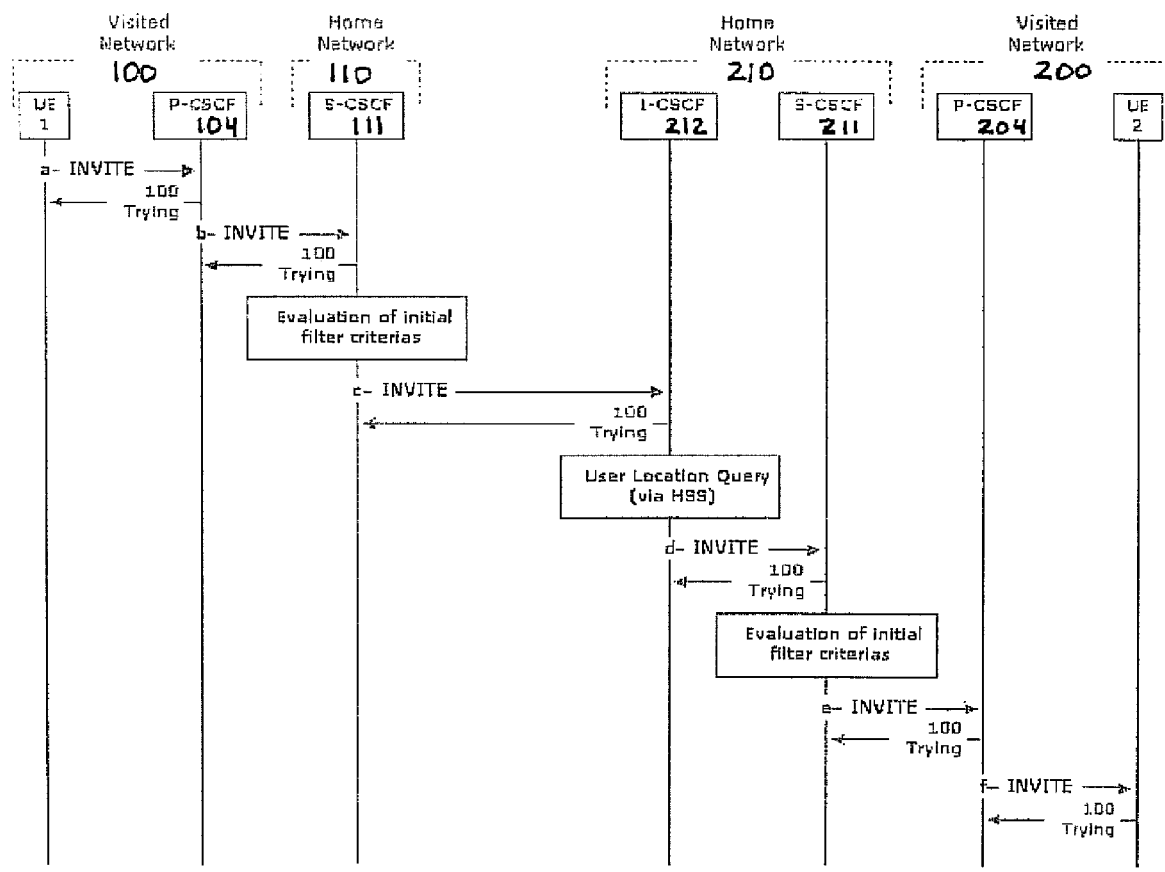
FIG. 2 is a flow diagram of the prior art signaling for a SIP communication session in the 3GPP network of FIG. 1.

FIG. 2 shows such a signaling flow to establish a Session Initiation Protocol (SIP) in the IMS architecture of FIG. 1. FIG. 3 shows a sample SIP INVITE message. The signaling in FIG. 2 includes a plurality of SIP Invite messages and 100 Trying messages as described above, as well as a query to HSS 212 as to the location of UE 2. Although not shown in FIG. 2, the SIP session is not fully established until appropriate acknowledgement ("200 OK") messages and sent in the direction from the called party to the calling party, followed by acknowledgement (ACK) messages in the direction from the calling party to the called party.

FIG. 4 shows an exemplary 3GPP network architecture in which a preferred embodiment of the invention may be practiced. In addition to the conventional network elements, such as UEs and CSCFs, there is a new element, a Network Element Information Server (NEIS) 400. NEIS 400 may be a separate element as shown in FIG. 4, but is preferably integrated with or into P-CSCF 114 or similar application server. UE 1 subscribes (1) to the service provided by NEIS 400 that provides location information about the various network elements through which a communication session is routed. The service subscription may be carried out by any one of a plurality of suitable processes (such as, for example, via web site, or by placing a specific header or content into SIP messages). Alternatively, service subscription may happen automatically without specific user action, e.g. based on user profile, or default policy. After successfully subscribing, when UE 1 initiates a communication session, for example, places a call, to UE 2, the requested service is provided by NEIS 400. The service may also be provided without NEIS 400, with the network elements support the service and the information being delivered directly to UE 1, instead of to NEIS 400.

During the session setup, such as a call attempt (and possibly even during the session), UE 1 receives SIP NOTIFY messages (2) from NEIS 400 which contain information about the network elements along the route of the communication session. The Network Element Info Server gets the information either directly from SIP message headers, or via reference, from servers located elsewhere in the network, where the location information is stored by the intermediate network elements (3). (Alternatively, if the location information of the intermediate network elements is not stored anywhere, NEIS 400 itself may find out the geographical location of the intermediate elements.) The provisional SIP responses, such as "100 Trying" sent by intermediate elements to NEIS 400 or UE1, may also provide the information.

Preferably, each (SIP based) network element along the route can add advanced information into the (SIP) packet header. The advanced information may include the geographical location of the network element, weather in that location and additional location based information. It may also include information about the network element itself, such as platform, CPU, and memory. The network element may also add location information for (on behalf of) related elements (for example, a media gateway, perhaps controlled by said network element, or HSS). It is also possible to include status information for each network element, such as "Completed", "In progress", "Failed", "Waiting for response", "Not responding", etc).

This information (especially location information) is sometimes considered confidential. Preferably, the granularity of the information provided is determined by the owner of the network element (e.g. operator). For example, it is possible to use only city or state level information (instead of GPS co-ordinates). It is also possible to provide only generic or virtual information ("e.g. T-Mobile server Dragon"). Yet, some network operators may want to provide more detailed information as a way to differentiate themselves (it is also possible that law enforcement and/or standardization may require certain information anyway). It is also possible to provide different levels of authentication. For example, law enforcement and friendly network operators and perhaps premium users can access more detailed information, while basic end-users get only less detailed information).

Preferably, each network element along the route adds its own information into the packet. The granularity and access rights for the added information are decided by the network element. Either, all subsequent network elements along the route may access the information (if authentication allows it), or only the end user device or the last network element before the end user device (for example, CSCF, NEIS 400) can access the information and decide if anything is sent to the end user device. The last network element before the end user device (for example, CSCF) may provide the network element information only to premium end users that have subscribed to the service. It is also possible that the CSCF or NEIS 400 aggregates the information about all network elements along the route and sends only a summary of the route to the end user. It is further possible that the information can be sent elsewhere, such as to law enforcement or to the called party, in addition to the calling party.

IETF RFC 3455 by M. Garcia-Martin et al, entitled "Private Header (P-Header) Extensions to the Session Initiation Protocol (SIP) for the 3rd-Generation Partnership Project (3GPP)", January 2003 describes P headers for SIP, although it does not describe how to add advanced network element information into packets or sessions. In the preferred embodiments, information is added to SIP packets so that every time a network element adds information, it adds a new P-Network-Element-Info SIP header. (It is not possible to add information into SIP message body by proxy. Only headers can be added. However, the intermediate network element may add to information into the message body of provisional messages which it initiates, such as "100 Trying", and sent those to the NEIS 400 or UE1.) The header may contain either the information itself, or preferably, it may contain a reference to where the information is stored (for example, a web address or a SIP event package, to be accessed via SIP SUBSCRIBE/NOTIFY). The accessing may occur in the manner indicated in the Internet Draft entitled "Location Conveyance for the Session Initiation Protocol" by James Polk et al, Jul. 9, 2007. However, this document assumes that only the endpoint location is carried in SIP. In the preferred embodiments of the invention, the location of several network entities along the route can be added, and can be optimally reported to the end-user device.

An example SIP header field, as added by an intermediate network element in the preferred embodiments, might look like this:
P-Network-Element-Info: <sips:3sdefrhy244@resources.operator.com>; inserted-by.cscf1.example.com; element=cscf1.example.com; role=CSCF For this example SIP header field, the recipient may use SIP SUBSCRIBE (sent to sips:3sdefrhy244@resources.operator.com) and receive a detailed list of information in, for example, XML format.

It is also possible that the header itself lists the added information. For example, location information could be represented with longitude, latitude and altitude like this:
P-Network-Element-Info: location=GPOS, −31.6482, 134.8652, 10.1; element=cscf1.example.com; role=CSCF
This alternative is faster and simpler, but is otherwise a more limited way of providing the location information.

P-CSCF 114 or NEIS 400 may remove the headers from the messages before they are sent to UE1. Alternatively, P-CSCF 114 may leave the headers in place and let UE 1 decide what to do with the information. For example, UE 1 may do nothing or may get information about some or all of the network elements.

In an alternative embodiment, the intermediate network elements may add location information into another message that it initiates, preferably a message that it initiates as part of the communication session setup, and send those to NEIS 400 or UE 1. Even in the SIP environment, the location information may be added to provisional messages that it initiates, such as the "100 Trying" messages, rather than the SIP packets. This has the advantage that location information can be added into the message body of those provisional messages, whereas location information cannot be added into the message body of SIP packets.

NEIS 400 may store all of the information in a database. The location information may be stored permanently (in a bulk storage medium such as a hard drive) or temporarily (in memory). The term "store" when used in this application includes both permanent and temporary storage. It then controls the access of end-users, network operator personnel and outside entities (e.g. law enforcement) to the database to obtain the geographical location and route taken on a per session or per packet basis, as well as other relevant network element information.

Figure 5:
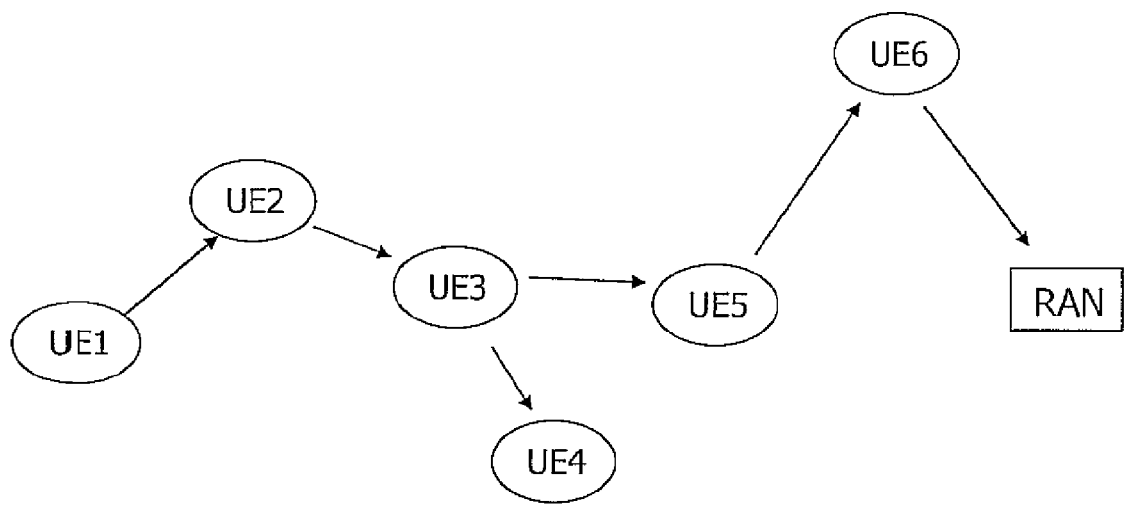
FIG. 5 is a diagram of the architecture of an ad-hoc network (proxy-require) with a network element information extension.

FIG. 5 illustrates an ad-hoc network architecture in which another preferred embodiment of the invention may be implemented. In this ad-hoc network, each network node, UE 2, UE 3, UE 4, UE 5 and UE 6, forwards a message from UE 1 and hopefully, the message eventually gets delivered to the Radio Access Network (RAN) and then to the core network. The sender (UE 1) adds a header, such as a "Proxy-require" header indicating that every network element along the route must support the network element information feature. It is also possible to use other headers, such as "Supported: network-element-info", indicating that UE 1 supports the route tagging of location information and that it is possible (but not mandatory) to add such location information.

These preferred embodiments thus provide geographical location information and other advanced information about the network elements along the route, preferably using SIP. The information may be added at each network element automatically without any specific request, or it may depend on each message. For example, the message may contain a specific SIP header triggering the feature, or utilize a SIP SUBSCRIBE, or a web based request may have been received for the service.

The additional information is added by the network elements along the route. The new information is added to SIP headers either directly (so the header contains the information), or by a reference so that the SIP headers contain information on how to access the location information for a given network element. Eventually, the end-user device gets the information (e.g. SIP message with 6 P-network-element-info headers) or it may access the information via a reference. Alternatively, the last network element before the originating device (e.g. P-CSCF) may remove the extra information (P-network-element-info headers) and provide the information—perhaps in aggregated form—to the end user device via some mean, such as using SIP SUBSCRIBE/NOTIFY mechanism, SIP MESSAGE, web, or placing the information into SIP headers (e.g. one extra header containing a link or reference pointing to the said server). As a result, the geographical location information (and other information related to the intermediate elements for a given session or packet route) is available in real-time (e.g. during the call attempt), or in almost real-time, or afterwards. The network element info server stores the information and can provide statistics, summaries and aggregated information to the end user device and to other entities. It is also possible to use authentication and access levels to ensure that only certain parties can access the information. Also, it is possible to provide only coarse-granular information, (e.g. city level information as opposed to GPS co-ordinates). Network Element Info Server may also modify the information (e.g. do language translations, convert data into another format, provide a visualized map, provide distance between elements etc). It is also possible that network elements provide similar information about other elements (e.g. media servers, GGSN, HSS or RAN elements).

Although not addressed in detail, it is understood that the network elements have a construction that is known to those of ordinary skill in the art. In particular, there is a processing element, memory, and other components of the network elements that are operable to execute a software program which, when executed, causes the network element to carry out the operations and functions described in this application. This software program may be provided as software program product which is installed in the network element by downloading the software program or by reading the software program from a tangible recording medium readable by the network element.

In addition to the memory, the processing element of these network elements may also be connected to at least one interface or other means for transmitting and/or receiving data or the like. In this regard, the interface(s) can include at least one communication interface or other means for transmitting and/or receiving data. The communication interface may communicate with and receive data from external devices, using any known communication technique, whether wired or wireless, including but not limited to serial, universal serial bus (USB), Ethernet, Bluetooth, wireless Ethernet (i.e., WiFi), cellular, infrared, and general packet radio service (GPRS). Upon receipt of data, the network element may transmit the data to other network elements via the communication interface. A communication interface may also enable the network elements to communicate with a public network such as the Internet or any other suitable communication network.

The processing element may also be connected to at least one user interface that may include a display element and/or a user input element. The user input element, in turn, may comprise any of a number of devices allowing the client device to receive data and/or commands from a user, such as a keypad, a touch display, a joystick or other input device.

Figure 6:
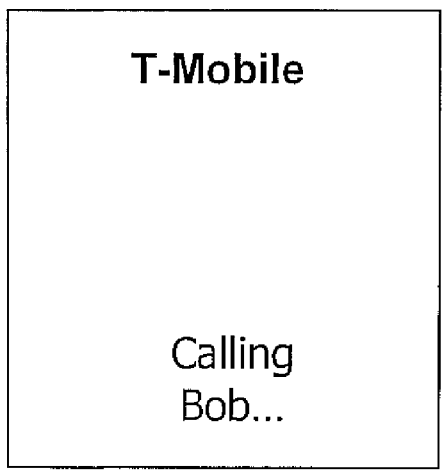
FIG. 6 is an example of the prior art end user device UI during call setup.

FIG. 6 shows a typical prior art method of showing session setup information to a user. It just shows the text "calling" to the end user initiating a call as the calling party. This is prior art method is not very informative.

Figure 7:
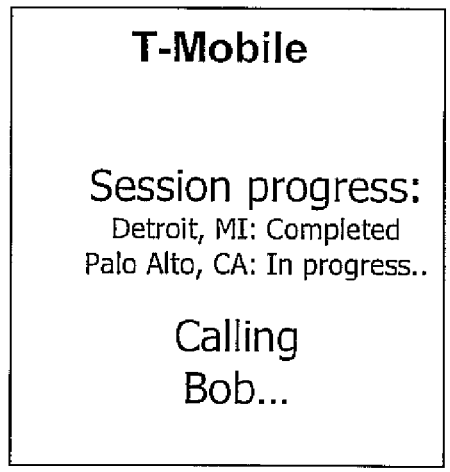
FIGS. 7-11 are examples of an end user device UI during call setup according to a preferred embodiment of the invention.

FIGS. 7-12 show preferred embodiments with richer user interfaces and how location and status information can be shown in the UI. FIG. 7 shows that, once the user has initiated the call attempt (e.g. by pressing Call button), the user interface shows, in real-time or near real-time the geographical information about the setup progress. In this example, it shows the location names for the two places where the session setup has been processed so far. This preferred embodiment preferably shows all locations, possibly with the status information (such as "Completed", "In progress", etc) for each location.

Figure 8:
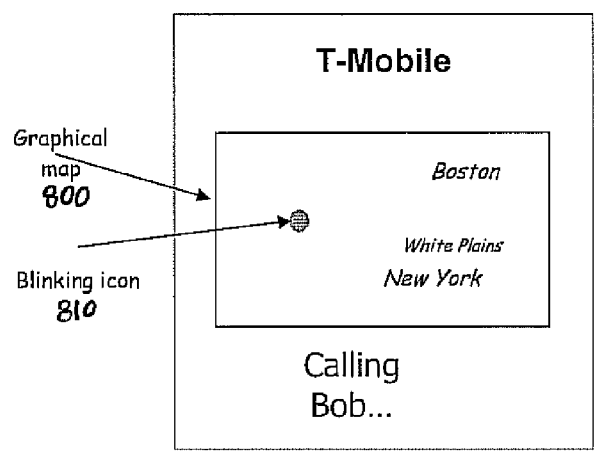

FIG. 8 shows another preferred embodiment in which the session progress (with regard to location status) is shown on a graphical map 800. It may be 2D map or 3D map. It may highlight the locations where session processing is done, such as by using a blinking icon 810 to highlight the location where the session is currently being processed. Alternatively, it may highlight more than one location or a line between locations.

Figure 9:
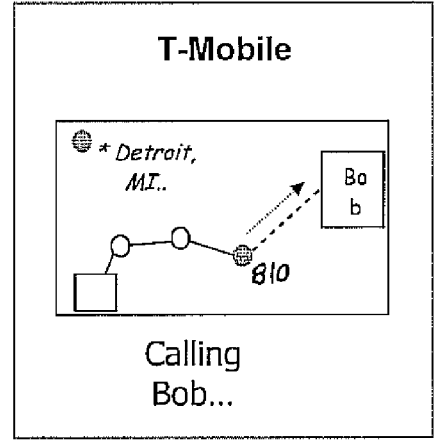

FIG. 9 shows a preferred embodiment in which the route is drawn, thereby creating a graphical presentation of the session progress (or message sending). The route may be drawn with or without a map.

Figure 10:
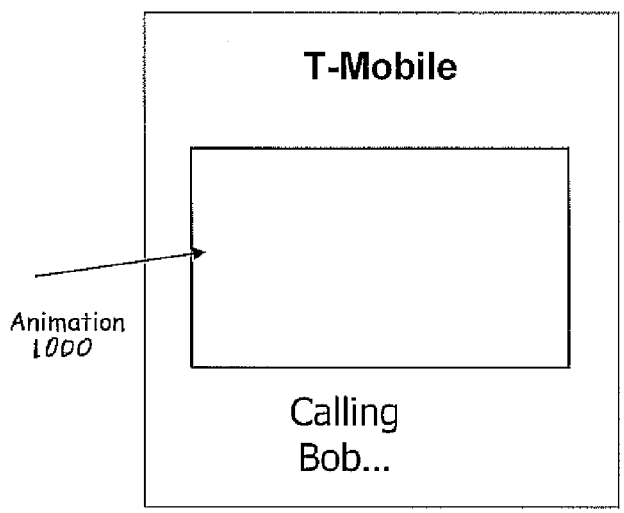

FIG. 10 shows a preferred embodiment in which there is an animation 1000 showing the progress of the communication session. It may be a Flash based animation or some other type of animation. It shows the location of network elements where the processing happens, and possibly the status for each element. It may also show pictures related to the persons involved in the call, or some other pictures (such as the network elements involved or nearby city pictures or landmarks).

Figure 11:
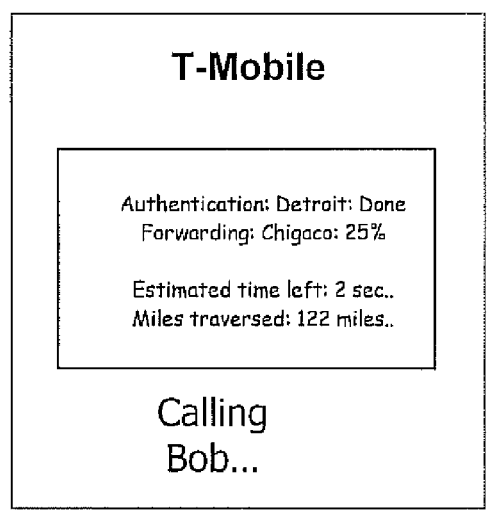

FIG. 11 shows a preferred embodiment where additional information is included in the user interface. The function for each location may also be revealed, for example, authentication, resource reservation, waiting for response, etc. It may also show the name of the elements involved, such as real name (CSCF), product name, or some other name (e.g., Signaling Server, Authentication Server, etc).

Progress may also be shown (for example, as a percentage—25%, estimated time left—2 seconds etc). Additional information shown may be how many miles the signaling traverses or how many countries or states it went through.

Figure 12:
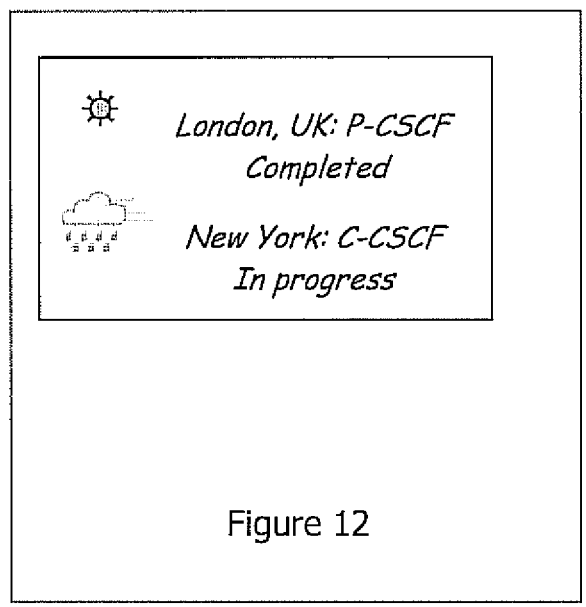
FIG. 12 is an example of an end user device UI during a call attempt according to another preferred embodiment of the invention.

FIG. 12 shows an example of how weather related information can be shown with icons, along with other information. The weather information may be shown in text, graphics, animation or icons. It may show weather in the locations where the session messages are processed.

FIG. 13 shows another preferred embodiment for message sending, in which a richer user interface is used and location and status information can be shown in the UI. For example, an instant message or SMS may be sent and similar geographical status information as to FIGS. 7-12 above may be shown to the user. It may also display the location of a routing problem (e.g. no response from messaging server in Dallas), and the operator name for each location.

FIG. 14 shows an example of a call log with visualized information. It includes a map and the routings for each of the calls made from the device. It can show the routes on a per session or message basis, or one combined version in which all calls are shown.

The abovementioned examples can be combined in anyway possible and obvious variations can be made to the invention. It is also possible to show the location information for the caller and the callee. The embodiments may be implemented in a variety of different end user devices, such as laptop computers, mobile phones, desktop phones, and other call and messaging devices.

Frequently, there may be several network elements in the same city or other location. They may all be shown or only the one location (covering all network elements in that location) may be shown. This decision, and other decisions on how detailed of location and status information should be displayed, may be made by the network operator and/or by the end user device.

If the real location information (e.g. for the called party) is not available, it is possible to show the home area or show that the information is private. In case operators or other parties do not want to reveal location information, it can be shown as private, or then it is possible to estimate the location. For example, it is possible to show the destination (home area or real location for the destination party, and caller's own location) and then estimate the route e.g. by showing numerical progress or even guess the locations based on the information available via other sources.

This invention can also be applied in ad-hoc network environment where the network elements (e.g. other end user devices) are moving so their locations can be updated on display. This invention can also be applied in multi-party conferences. For example, the path to each participant can be shown (if available), along with other status information. It is also possible to integrate this information with conference setup application and user interface. It is also possible to show the real locations for each conference participant in the conference application.

This invention can also be applied to registrations (e.g. SIP registrations in 3GPP networks). For example, when the phone is turned on, registration messages are sent to the network (possibly via visiting network, through intermediate network to the home network) and the geographical information about the route (with related status information) can be presented on the user interface.

Geographical location information and status information can be combined with other information, such as time information. For example, the UI may show that the processing is now in Detroit (or between Detroit and Palo Alto), so far the processing has lasted 4.5 seconds, the estimated time left is 1.4 seconds, and the time spent processing in Detroit was 2.5 seconds.

Geographical status information can be shown in session termination phase (for example, when ending the session). It can alternatively be shown during the session itself (ie signalling messages or user messages may be sent during the session).

It is also possible to show advanced status information for each location. For example, if a city has a drop rate of 20% or if there is a massive blackout. Operator information can also be shown for each location.

The geographical information may be detailed (for example, GPS co-ordinates), or may be merely the name of the city, county, state or country in which the network element is located. The geographical information is preferably provided by the network operator, but it may also be estimated, in case the actual information is not available in real-time, or for some other reason.

The implementation of the end user service depends greatly on the end user device. Most particularly, the implementation will depend on the operating system (such as Symbian) and existing UI (such as Series 60) of the end user device. It is preferable that the end user service be implemented through a computer program or other software recorded on a tangible medium. The end user service may also be implemented through firmware. Preferably, the end user service can be implemented so that it may be made easily available as a new service to the end user in a commercial wireless network environment involving a network operator.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus, comprising:
    a processing element; and
    a memory, said memory storing program instructions executable by said processing element to cause said apparatus to perform:
    receiving a signaling message at an intermediate signaling network element related to the initiation of a communication session between at least two end user devices in a wireless packet based network being routed through the intermediate signaling network element, and
    in response to said signaling message, providing by the intermediate signaling network element location information indicating the location of said intermediate signaling network element, the location information being provided to indicate the geographical location of intermediate signaling network elements involved in the routing of packets of said communication session between said at least two end user devices, the location information being provided as a subscription service to one of the end user devices having previously subscribed to the subscription service, wherein the subscription service provides the location information of the intermediate signaling network elements through which the communication session is routed, and wherein the location information comprises at least one of GPS coordinates, a name of a city, county, state or country.

2. The apparatus of claim 1, wherein the location information is inserted into the header of said signaling message.

3. The apparatus of claim 2, wherein the signaling message is a SIP signaling message, and the location information is provided using an extension header added to said SIP signaling message.

4. The apparatus of claim 3, wherein the extension header includes the location information or a reference to the location information.

5. The apparatus of claim 3, wherein the location information is provided to a network element information server or to the end-user device.

6. The apparatus of claim 1, further comprising providing said location information depending on the presence of a request for said location information in said signaling message.

7. The apparatus of claim 1, wherein the location information further comprises weather information related to the location of at least one of a plurality of intermediate signaling network elements associated with the routing of said communication session between said at least two end user devices.

8. The apparatus of claim 1, wherein the location information further comprises host platform information related to at least one of a plurality of intermediate signaling network elements associated with the routing of said communication session between said at least two end user devices.

9. The apparatus of claim 1, wherein the location information is configured to be provided to a network element information server or to at least one of said end-user devices.

10. An apparatus, comprising:
    a processing element; and
    a memory, said memory storing program instructions executable by said processing element to cause said apparatus to perform:
    initiating signaling messages related to the initiation of a communication session between said apparatus and another network element, and receiving location information related to at least the location of one or more intermediate signaling network elements in routing of said communication session between said apparatus and said another network element, wherein said location information is provided by said one or more intermediate signaling network elements,
    in response to said signaling messages and said location information, causing said apparatus to provide an indication of said location information related to at least the location of said one or more intermediate signaling network elements, the location information being provided to indicate the geographical location of said one or more intermediate signaling network elements involved in the routing of said communication session between said apparatus and another network element, the location information being provided as a subscription service to one of the end user devices having previously subscribed to the subscription service, wherein the subscription service provides the location information of the intermediate signaling network elements through which the communication session is routed, and wherein the location information comprises at least one of GPS coordinates, a name of a city, county, state or country.

11. The apparatus of claim 10, wherein the signaling messages are SIP signaling messages.

12. The apparatus of claim 10, wherein the apparatus displays the routing of said communication session in real-time or near real-time while the communication session is being set up or after the communication session has been set up.

13. The apparatus of claim 10, wherein the location information includes status information relating to the status of the routing and the apparatus displays said status information in real-time or near real-time while the communication session is being set up or after the communication session has been set up.

14. An apparatus, comprising:
a processing element; and
a memory, said memory storing program instructions executable by said processing element to cause said apparatus to perform:
receiving signaling messages from a plurality of intermediate signaling network elements related to the initiation of a communication session between at least two end user devices in a packet based network being routed through said plurality of intermediate signaling network elements and containing location information related to said plurality of intermediate signaling network elements, and
storing location information indicating the location of at least one intermediate signaling network element, the location information being provided by the intermediate signaling network element to indicate the geographical location of intermediate signaling network elements involved in the routing of said communication session between said at least two end user devices, and providing said location information in real-time or near real-time while the communication session is being set up or after the communication session has been set up, the location information being provided as a subscription service to one of the end user devices having previously subscribed to the subscription service, wherein the subscription service provides the location information of the intermediate signaling network elements through which the communication session is routed, and wherein the location information comprises at least one of GPS coordinates, a name of a city, county, state or country.

15. An apparatus of claim 14, wherein the signaling messages are SIP signaling messages.

16. A method, comprising:
receiving at an intermediate signaling network element a signaling message related to the initiation of a communication session between at least two end user devices in a packet based wireless telecommunications network and being routed through intermediate signaling network elements of said packet based wireless telecommunications network; and
in response to the signaling message, providing location information by the intermediate signaling network element indicating the location of the intermediate signaling network element, the location information being provided to indicate the geographical location of intermediate signaling network elements involved in the routing of said communication session between said at least two end user devices, the location information being provided as a subscription service to one of the end user devices having previously subscribed to the subscription service, wherein the subscription service provides the location information of the intermediate signaling network elements through which the communication session is routed, and wherein the location information comprises at least one of GPS coordinates, a name of a city, county, state or country.

17. The method of claim 16, wherein the location information is inserted into the header of said signaling message.

18. The method of claim 17, wherein the signaling message is a SIP signaling message, and the location information is provided using an extension header added to said SIP signaling message.

19. The method of claim 18, wherein the extension header includes the location information.

20. The method of claim 18, wherein the extension header includes a reference to the location information.

* * * * *